J. A. JOHNSON.
CRANK CASING SUPPORT.
APPLICATION FILED AUG. 21, 1916.
1,239,915.
Patented Sept. 11, 1917.
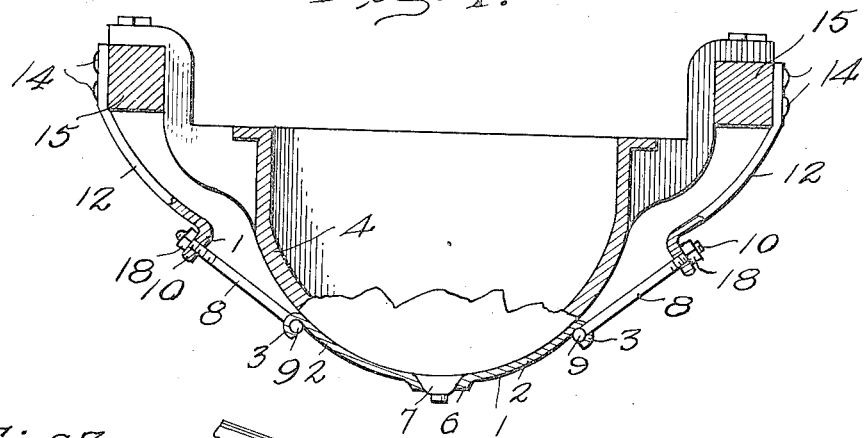
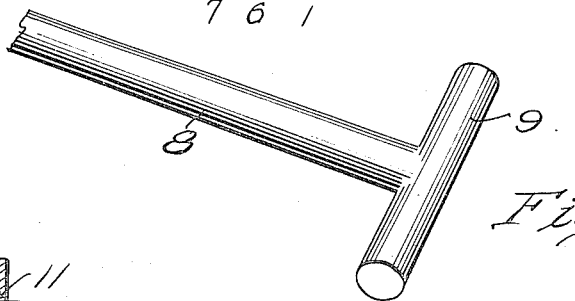
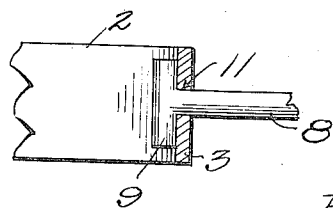
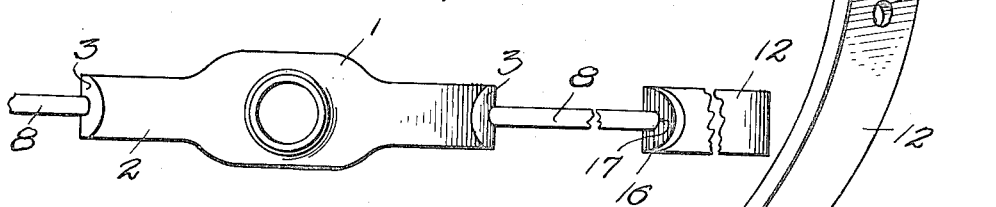
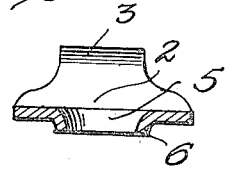
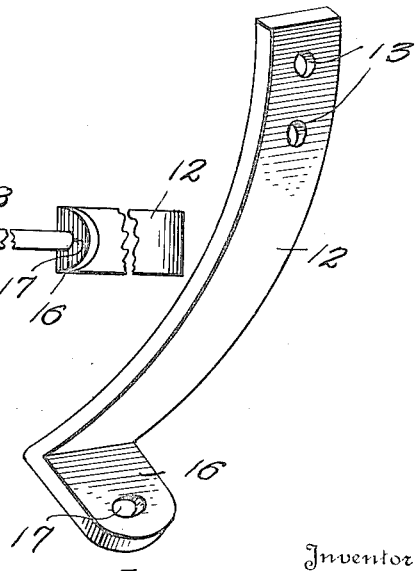
Inventor
John A. Johnson
By E. E. Crooman & Co.
his Attorneys

UNITED STATES PATENT OFFICE.

JOHN A. JOHNSON, OF WESTERLY, RHODE ISLAND.

CRANK-CASING SUPPORT.

1,239,915.

Specification of Letters Patent.

Patented Sept. 11, 1917.

Application filed August 21, 1916. Serial No. 116,109.

*To all whom it may concern:*

Be it known that I, JOHN A. JOHNSON, a citizen of the United States of America residing at Westerly, in the county of Washington and State of Rhode Island, have invented certain new and useful Improvements in Crank-Casing Supports, of which the following is a specification, reference being had therein to the accompanying drawing.

This invention relates to a crank casing support and has for its principal object the production of a simple and efficient device which is constructed so as to efficiently support the crank casing and thus relieve the strain or stress from the securing ears of the casing, whereby the possibility of the casing being broken from its correct position when in operation is eliminated.

Another object of this invention is the production of a crank casing support which is adjustably mounted, thereby being constructed so as to take up any play which might possibly take place and in this manner positively fit snugly at all times upon the crank casing, thus preventing the crank casing from being accidentally broken from its correct position when in operation due to vibration or strain thereon.

Another object of this invention is the production of a crank casing support which is so formed as to be carried by the frame of the automobile, fitting under the crank casing, and being adjustably mounted so as to fit snugly upon the crank casing and thus support the same and relieve the strain from the securing ears of the crank casing.

With these and other objects in view this invention consists of certain novel combinations, constructions, and arrangements of parts as will be hereinafter fully described and claimed.

In the accompanying drawing:—

Figure 1 is a side elevation of the crank casing support, partly in section, illustrating the same in use.

Fig. 2 is a bottom plan view of the crank casing support, partly broken away.

Fig. 3 is a detail perspective view of one of the adjusting bolts.

Fig. 4 is a fragmentary sectional view of a portion of the device, illustrating the manner in which the T-shaped end of one of the adjusting bolts engages the cradle plate.

Fig. 5 is a detail perspective view of one of the supporting straps.

Fig. 6 is a transverse section through the cradle plate.

Referring to the accompanying drawings by numerals it will be seen that the cradle plate comprises an enlarged central body 1. This body 1 has the reduced integral arms 2 extending from its ends and these arms 2 terminate in the outwardly bent lips 3. The cradle plate is substantially concaved upon its inner surface throughout its entire length, as shown in Fig. 1, so as to fit snugly upon the outer looped portions of the crank casing 4. The body 1 of this cradle plate is provided with an opening 5 surrounded by the neck 6 to accommodate the discharge neck 7 of the crank casing 4.

There are used in connection with this support a pair of adjusting bolts 8, each of which has a transversely extending head 9 formed thereon so that each bolt will be constructed so as to provide a T-shaped structure as shown in Figs. 3 and 4. The opposite end of each bolt 8, however, is threaded as indicated at 10, for purposes to be hereinafter set forth. It will be seen that when in use the bolts 8 are passed through the openings 11 formed in the outwardly bent lips 3 of the arms 2 and owing to the curvature of the lips 3 the transversely extending heads 9 of the bolts 8 will fit snugly within the lips, as shown in Fig. 1.

The supporting straps 12 have apertures 13 formed therein so as to permit the bolts or screws 14 to be passed through the apertures 13, thereby fixedly mounting the supporting straps 12 upon the frame or side beams 15 of the automobile. These supporting straps 12 are bent inwardly toward their lower ends although at their extreme lower portions they terminate in the outwardly extending ears 16 in which there are formed apertures 17. After the bolts 8 have been passed through the openings 11 formed in the outwardly extending lips 3 of the cradle plate, the threaded ends 10 thereof are passed through the apertures 17 formed in the ears 16 of the supporting straps 12, after which the retaining nuts 18 are threaded upon the threaded ends 10 of the bolts 8, thereby positively securing the bolts and the supporting straps and in turn retaining the cradle plate upon the lower outer portions of the crank casing 4, as shown in Fig. 1.

It will be seen that simply by tightening the nuts 18 upon the ears by the further rotation of the nuts upon the threaded ends 10 of the bolts the crank casing support will be held at a higher tension upon the casing, thus efficiently supporting the same.

It is well known that in the crank casings now in use the weight thereof and the increased stress or strain caused by the vibrations of the operation of the engine must necessarily be supported by the "ears" of the crank casing, which fit upon the frame of the automobile. As a consequence, very frequently increased strain caused the ears to be snapped or broken off, thereby causing the casing to either fall or hang loosely, thus reducing the efficiency of the casing which is used for inclosing the crank and pitmen of the engine. By the employment of the crank casing support as disclosed by this invention it will be seen that the crank casing will be supported independently of its ordinary ears, and the construction of the support is such as to eliminate any possibility of its being accidentally broken. It should be noted that owing to the resilient construction of the downwardly extending supporting straps 12 the support may be held at a very high tension, and held far better upon the lower portions of the crank casing 4 simply by the adjusting of the nuts upon the threaded ends of the bolts 8 so as to swing the lower ends of the straps inwardly for a slight distance by pulling the ears 16 slightly downwardly.

From the foregoing description it will be seen that a very simple and efficient crank casing support has been constructed which is so formed as to be cheaply produced, although when in use it will reach the highest degree of efficiency in operation, since the cradle plate will fit snugly upon the crank casing, while the bolts will positively hold this cradle plate firmly upon the crank casing by their adjustable engagement with the supporting straps.

What is claimed is:—

1. In a device of the class described, the combination of a cradle plate, said cradle plate being adapted to fit upon a crank casing, bolts connected to said cradle plate, and supporting straps adjustably connected to said bolts, said supporting straps being adapted to be carried upon the frame of an automobile, whereby said supporting straps will cause said bolts to positively retain said cradle plate in a set position upon the crank casing.

2. In a device of the class described, the combination of a cradle plate, bolts connected to said cradle plate, and supporting straps having outwardly extending ears, said bolts being adjustably connected to said ears, whereby said cradle plate may be adjustably held in a set position upon the crank casing.

3. In a device of the class described, the combination of a cradle plate, said cradle plate comprising a central body having reduced arms extending from its end portions, said arms terminating in outwardly bent lips, said lips being provided with central openings, adjusting bolts having transversely extending heads formed thereon, whereby said bolts will be provided with T-shaped ends, said bolts extending through said openings of said lips, whereby said transversely extending heads will fit within said lips, said cradle plate being adapted to fit upon a crank casing, and means connected to said bolts for positively supporting the same, whereby said cradle plate will be held in engagement with the crank casing.

4. In a device of the class described, the combination of a cradle plate, said cradle plate comprising a central body having reduced arms extending from its end portions, said arms terminating in outwardly bent lips, said lips being provided with central openings, adjusting bolts having transversely extending heads formed thereon, whereby said bolts will be provided with T-shaped ends, said bolts extending through the openings of said lips, whereby said transversely extending heads will fit within said lips, said cradle plate being adapted to fit upon a crank casing, and means adjustably connected to said bolts for causing the bolts to hold the cradle plate upon a crank casing in an adjusted position.

5. In a device of the class described, the combination of a cradle plate, said cradle plate comprising a central body having reduced arms extending from its end portions, said arms terminating in outwardly bent lips, said lips being provided with central openings, adjusting bolts having transversely extending heads formed thereon, whereby said bolts will be provided with T-shaped ends, said bolts extending through the openings of said lips, whereby said transversely extending heads will fit within said lips, said cradle plate being adapted to fit upon a cank casing, supporting straps being adapted to be secured to the frame of an automobile, said straps being curved inwardly toward their lower portions and terminating in outwardly extending ears, said ears having apertures formed therein, said bolts extending through said apertures, and nuts mounted upon said bolts, and engaging said ears, whereby the supporting straps will hold the bolts so as to support the cradle plate upon the crank casing.

6. In a device of the class described, the combination of a cradle plate, said cradle plate comprisng a body having arms extending from its ends, said arms terminating in outwardly extending lips, said lips having openings extending therethrough, adjusting bolts having heads formed thereon, said bolts extending through said openings, said heads bearing upon said lips and means connnected to said bolts for supporting the same.

7. In a device of the class described, the combination of a cradle plate, said cradle plate comprising a body having arms extending from its ends, said arms terminating in outwardly extending lips, said lips having openings extending therethrough, adjusting bolts having heads formed thereon, said bolts extending through said openings, said heads bearing upon said lips, and means for adjustably supporting said bolts.

8. In a device of the class described, the combination of a cradle plate having lips formed thereon, said lips having openings, adjusting bolts having heads formed thereon, said bolts extending through said openings, said heads bearing upon said lips, and means for adjustably supporting said bolts.

9. In a device of the class described, the combination of a cradle plate having lips formed thereon, said lips having openings, adjusting bolts having heads formed thereon, said bolts extending through said openings, said heads bearing upon said lips, and means connected to said bolts for supporting the same, thereby supporting said cradle plate.

10. In a device of the class described, the combination of a cradle plate, said cradle plate comprising a body having arms extending from its ends, said arms terminating in outwardly extending lips, said lips having openings extending therethrough, adjusting bolts having heads formed thereon, said bolts extending through said openings, said heads bearing upon said lips, and straps connected to said bolts for supporting the same, said straps being adapted to be mounted upon a supporting element.

11. In a device of the class described, the combination of a cradle plate, said cradle plate comprising a body having arms extending from its ends, said arms terminating in outwardly extending lips, said lips having openings extending therethrough, adjusting bolts having heads formed thereon, said bolts extending through said openings, said heads bearing upon said lips, supporting straps having outwardly extending ears formed thereon, said ears having apertures extending therethrough, said bolts projecting through said apertures, and nuts engaging the projecting ends of said bolts, said nuts bearing upon said ears, thereby adjustably supporting said bolts.

12. In a device of the class described, the combination of a cradle plate having lips formed thereon, said lips having openings, adjusting bolts having heads formed thereon, said bolts extending through said openings, said heads bearing upon said lips, and straps connected to said bolts for supporting the same, said straps being adapted to be mounted upon a supporting element.

13. In a device of the class described, the combination of a cradle plate having lips formed thereon, said lips having openings, adjusting bolts having heads formed thereon, said bolts extending through said openings, said heads bearing upon said lips, supporting straps having outwardly extending ears formed thereon, said ears having apertures extending therethrough, said bolts projecting through said apertures, and nuts engaging the projecting ends of said bolts. said nuts bearing upon said ears, thereby adjustably supporting said bolts.

In testimony whereof I hereunto affix my signature.

JOHN A. JOHNSON.